United States Patent
Narayan et al.

(10) Patent No.: US 9,359,880 B2
(45) Date of Patent: Jun. 7, 2016

(54) METHODS AND SYSTEMS FOR MANAGING UNDERGROUND ASSETS

(75) Inventors: Visvanathan Lakshmi Narayan, Chennai (IN); Pradeep Kishore, Chennai (IN); Anirudh Velikad Krishnamurthi, Chennai (IN)

(73) Assignee: Infosys Limited, Bangalore (IN)

(*) Notice: Subject to any disclaimer, the term of this patent is extended or adjusted under 35 U.S.C. 154(b) by 458 days.

(21) Appl. No.: 13/111,307

(22) Filed: May 19, 2011

(65) Prior Publication Data

US 2012/0257785 A1 Oct. 11, 2012

(30) Foreign Application Priority Data

Apr. 7, 2011 (IN) .......................... 1192/CHE/2011

(51) Int. Cl.
*G06F 17/30* (2006.01)
*G06F 7/00* (2006.01)
*E21B 44/00* (2006.01)
*G06F 17/00* (2006.01)

(52) U.S. Cl.
CPC .......... *E21B 44/00* (2013.01); *G06F 17/30244* (2013.01); *G06F 17/30259* (2013.01)

(58) Field of Classification Search
CPC .................. G06F 17/30365; G06F 17/30017; G06F 17/30244; G06F 17/20259
USPC .................... 707/769, 921, 999.001–999.005
See application file for complete search history.

(56) References Cited

U.S. PATENT DOCUMENTS

| 7,213,048 | B1* | 5/2007 | Parupudi et al. ............... 709/203 |
| 2007/0061043 | A1* | 3/2007 | Ermakov ................ A47L 5/225 |
| | | | 700/263 |
| 2007/0219722 | A1* | 9/2007 | Sawyer et al. ..................... 702/1 |
| 2009/0024326 | A1* | 1/2009 | Young et al. ...................... 702/5 |
| 2009/0055206 | A1* | 2/2009 | Orbke ................................ 705/1 |
| 2009/0106542 | A1* | 4/2009 | Dubs et al. ........................ 713/1 |
| 2009/0157746 | A1* | 6/2009 | More et al. ................. 707/104.1 |
| 2009/0210388 | A1* | 8/2009 | Elson ................. G06F 17/30241 |
| 2010/0153465 | A1* | 6/2010 | Dasgupta ....................... 707/802 |
| 2011/0022433 | A1* | 1/2011 | Nielsen et al. .................... 705/7 |

* cited by examiner

*Primary Examiner* — Kannan Shanmugasundaram
(74) *Attorney, Agent, or Firm* — Marc S. Kaufman; Mark T. Vogelbacker; Reed Smith LLP (57) ABSTRACT

Systems and methods for managing underground assets are disclosed. One or more computing devices may be used to receive a request for clearance to excavate including a location identifier, resolve a location based on the location identifier, and retrieve asset data corresponding to the location from an asset location database. The asset location database can include location data regarding the positions of a plurality of assets associated with a plurality of different asset owners and may be maintained by one or more updates regarding the positions of assets from computing devices associated with the different asset owners. The systems and methods can include determining if one or more assets are buried proximate the location based on the retrieved data and transmitting data related to the determination of assets buried proximate the location.

25 Claims, 8 Drawing Sheets

METHODS AND SYSTEMS FOR MANAGING UNDERGROUND ASSETS

RELATED APPLICATION DATA

This application claims priority to Indian Patent Application No. 1192/CHE/2011, filed Apr. 7, 2011, which is hereby incorporated by reference in its entirety.

BACKGROUND

Many assets, such as utility lines (e.g., power, gas, water, sewage, communication, military/security, etc.) and other infrastructure assets owned by both government and private enterprises, are buried underground. When excavating (e.g., digging, grading, demolishing, cultivating, augering, blasting, boring, and the like), excavation equipment and underground assets that the excavator may not know were present can be damaged. Such damage may cause a disruption of service to customers, expensive repairs, and costly litigation, all of which can additionally lead to loss of reputation for the excavator. In extreme cases, such accidents may even lead to injury or death.

Before excavating, in some areas an excavator may submit a dig ticket to a call center requesting clearance to excavate at a specific location. Indeed, in many regions, excavators are required by law to submit dig tickets and receive approval before excavating. The call center receiving the dig tickets is generally in communication with various asset owners and must contact the asset owners to determine if there are underground assets at each excavation location. If there are no underground assets within a determined proximity of each excavation location, the dig ticket may simply be approved, thereby allowing the excavator to excavate at the excavation location. However, if there are underground assets proximate (e.g., within a determined buffer zone) of the excavation location, a locator may need to travel to the excavation location and mark the location of the underground assets to allow the excavator to avoid excavating within a buffer zone of any underground asset.

Generally, implementations employ one of two variants of this system. In the first variant, the call centers employ Geographic Information System ("GIS") systems that include land based data (e.g., map information) and underground asset data mapped to each other. Each call center generally employs an independent GIS system. However, underground asset data is often not up to date even though each call center may frequently check with the several underground asset owners (e.g., utilities and government offices) for record maintenance. Additionally, land based data in GIS systems may be out of date if not constantly updated. Thus, even though a call center may try to keep their GIS system current, conventional GIS systems may fail to reflect recent changes in either land based data or underground assets data, leading to excavators damaging underground assets. In the second variant, a GIS system may be individually maintained by each asset owner (utilities, etc.) and a call center may only dispatch the excavation request to these asset owners who in turn will determine if the excavation affects their assets. Thus, in the second variant, the call center only acts as a conduit between the excavator and asset owners.

Further, in much of the world, addressing of parcels of land is inconsistent or nonexistent and many excavators may not have access to sophisticated sensing equipment such as Global Positioning System ("GPS") sensors. This often makes it difficult for a call center to locate an excavation location indicated on a dig ticket even on their GIS system. Even if the excavation location can be found on the GIS system, it may be difficult for a locator to travel to the excavation location to manually expect the excavation location or to mark the location of underground assets.

While systems and methods are described herein by way of example and embodiments, those skilled in the art recognize that systems and methods for managing underground assets are not limited to the embodiments or drawings described. It should be understood that the drawings and description are not intended to be limiting to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Disclosed embodiments provide computer-implemented methods and systems for managing underground assets. These methods and systems may improve accuracy, correctness, and vintage of map, address, and asset location data. By reducing the number of dig tickets which require a locator to travel to the excavation location, the majority of the tickets can be resolved automatically without requiring a field visit, which may reduce the overall cost of ownership and maintenance of these systems.

Figure 1:
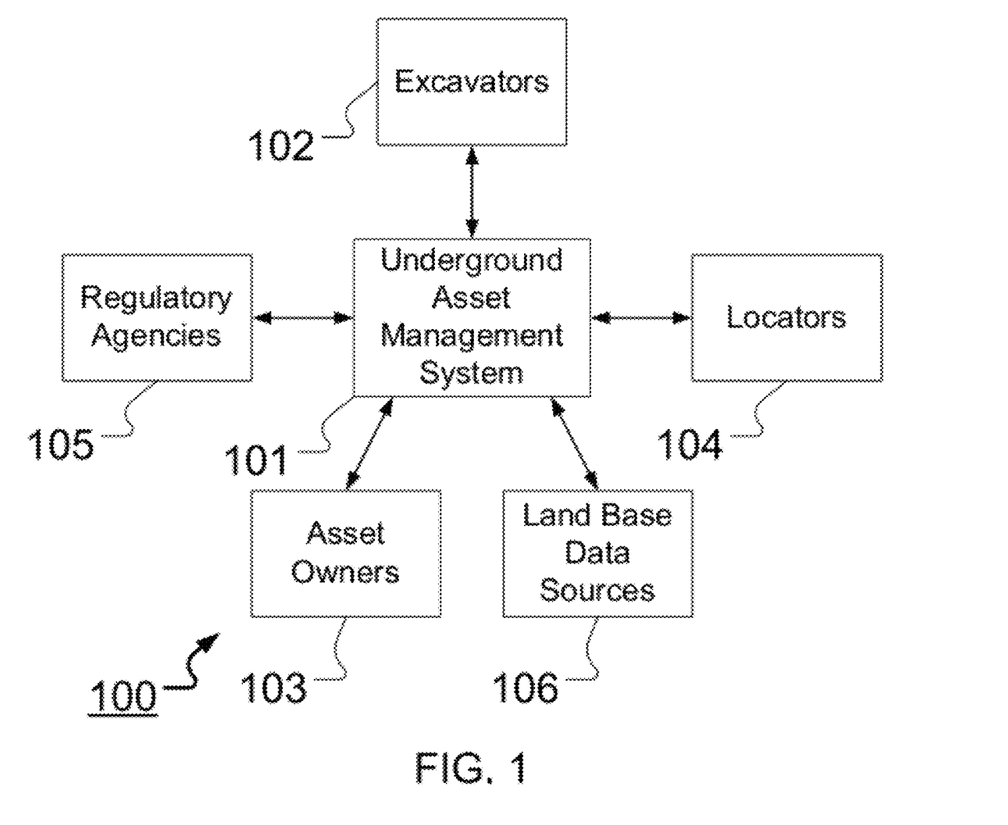
FIG. 1 shows a functional block diagram of an exemplary system including a central Underground Asset Management System operatively coupled to one or more excavators, one or more locators, one or more underground asset owners, and one or more regulatory agencies.

FIG. 1 shows a functional block diagram of system 100 including a central Underground Asset Management System ("UAMS") 101 operatively coupled to one or more excavators 102, one or more locators 104, one or more underground asset owners 103, one or more regulatory agencies 105, and one or more land based data sources 106. Of course, in embodiments, UAMS 101 may be operatively coupled to greater or fewer entities. For example, in countries where there are no regulations relating to excavation, UAMS 101 may not be operatively coupled to any regulatory agencies 105.

UAMS 101 may receive asset location information from one or more asset owners 103. The asset location information may include geographic location coordinates of the asset (e.g., latitude and longitude of one or more points on the asset), geometric reference of line assets (like telecom lines, power lines, gas pipes, etc), burial depth (e.g., depth below the ground level or altitude in relation to mean sea level), type of asset (e.g., gas line, telecommunication cable, septic tank, etc.), area to be buffered surrounding the asset, and the like. UAMS 101 may then map the underground assets to current land based data. UAMS 101 may maintain current asset location information by periodically (e.g., hourly, daily, weekly, etc.) sending a request to asset owners 103 requesting updates of asset location information that has changed. For example, each one of asset owners 103 may provide an Application Programming Interface ("API") to allow UAMS 101 to directly request updated asset location information. Of course, data may be transmitted via interfaces other than APIs. Alternatively, each one of asset owners 103 may automatically send updates to asset location information as the asset location information changes. Asset owners 103 may be motivated to keep all asset location information stored by UAMS 101 current to ensure that newly buried asserts are not damaged by excavation.

UAMS 101 may also maintain current land based information. UAMS 101 may periodically receive current land based data from one or more land based data sources 106, such as ESRI™, GOOGLE™, NASA™, and others. UAMS 101 may, for example, store land based data in a central database and update the land based data as one or more providers of land based data update their data. UAMS 101 may further be configured to determine the most accurate land based data provided by various sources. For example, if land based data from plural sources are inconsistent, UAMS 101 may include a set of rules to determine the accuracy of the various sources. A set of rules may include, for example, a consistency check based on metadata provided by data provider. Through custom built algorithms, UAMS 101 may check data formats, coordinate systems, coordinate numbers of features and feature classes, and the like in addition to visual checking (e.g., edge matching) on different data sources. For example, if land based data from three sources are consistent with each other and a fourth source is anomalous, UAMS 101 may determine that only the consistent land based data should be used. Alternatively, if land based data from one data source has been updated more recently than others, the most recently updated land based data should be used. Of course, other rules may also be applied. UAMS 101 may also be configured to alert a user of potential inconsistencies between data sources so that the user can confirm the correct data.

Alternatively, rather than maintaining current land based information UAMS 101 may be configured to request land based information for an area from land based sources 106 and for assets from asset owners 103 in response to receipt of a dig ticket. Such embodiments may require UAMS 101 to store less data, but may require additional processing in response to receipt of a dig request.

UAMS 101 may map the underground assets to the land based data. Because both the underground asset locations and the land based data may be maintained up-to-date, UAMS 101 may always maintain an up-to-date mapping of the underground assets to the land based data.

UAMS 101 may receive a dig request from an excavator 102 specifying an excavation location at which the excavator would like to excavate. An excavator 102 may provide an excavation location in various ways, as described in detail below. UAMS 101 may determine if there are any underground assets within a determined proximate distance of the excavation location. If no underground assets are found to be proximate the excavation location, UAMS 101 may confirm to the excavator that there are no underground assets proximate the excavation location. Alternatively, if there are underground assets proximate the excavation location, UAMS 101 may automatically generate a locate ticket for a locator 104 to travel to the excavation location to manually determine if there are underground assets and/or to mark the location of underground assets. A locator 104 may provide information back to UAMS 101 relating to the excavation location, for example if a locator 104 uses a sensor to confirm the location of an asset and also finds an additional asset that UAMS 101 was not aware of, for example due to delays in updating data, due to unauthorized burying, or due to classified governmental activities, a locator 104 may provide location information to UAMS 101 about the additional asset and UAMS 101 may add the additional assets to their mapped land based and underground asset data.

UAMS 101 may additionally be operatively coupled to one or more regulatory agencies 105. For example, regulatory agencies 105 may restrict excavation in some regions or may be required to preauthorize excavation. Thus, UAMS 101 may request permission to excavate in the excavation location indicated in a dig ticket before granting the dig ticket. Alternatively, UAMS 101 may provide periodic information to a regulatory agency 105 for record keeping purposes.

Thus, system 100 provides a single centralized UAMS 101. Beneficially, asset owners may rely on the centralized UAMS 101 by simply transmitting their updated asset data rather than having to maintain their own costly independent systems. Additionally, system 100 may be much less expensive to maintain in general because economy of scale distributes the cost of a singe centralized UAMS 101 unlike several individual call in centers.

Figure 2:
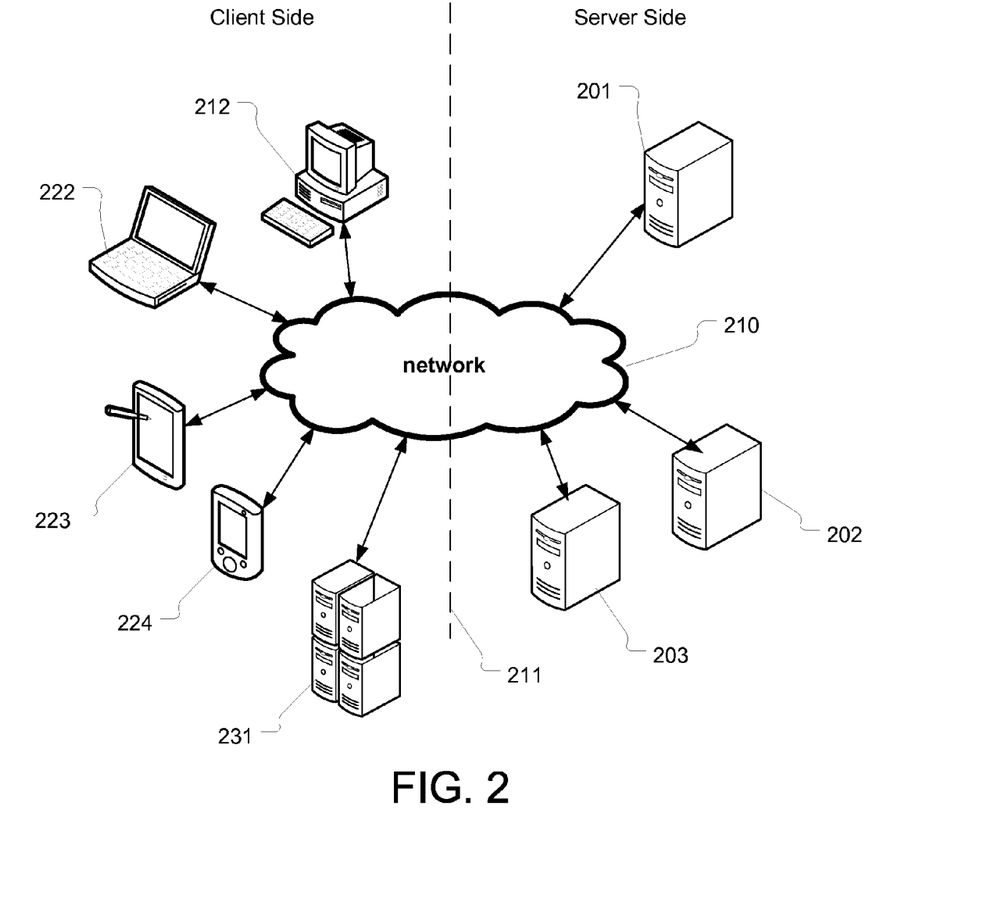
FIG. 2 shows an exemplary computer architecture configured to use online services to centrally maintain land based and underground asset data for distribution to one or more computing devices over a network.

FIG. 2 shows an exemplary computer architecture configured to use online services to centrally maintain land based and underground asset data for distribution to one or more computing devices over a network. For example, a web server 201 may be configured to provide an interface to UAMS 101 (shown in FIG. 1) via a network 210, such as the internet, a wide-area-network ("WAN"), a local-area-network ("LAN"), a wireless data network, or any other network. Client devices (e.g., devices used by asset owners, excavators, locators, regulatory agencies, and the like) may be used to place dig tickets, receive or respond to locate tickets, access the land based and underground asset data, and the like. A client device may be, for example, a computer 121, a laptop 122, a tablet 123 (e.g., an IPAD™), a smartphone 124 (e.g., an IPHONE™, a BLACKBERRY™, or an ANDROID™ based phone), or any other computing device. Web server 201 may provide the underground asset data through an application executed on the web server 201 and accessed by a client device (e.g., Software as a Service ("SaaS")), may provide a website interface to allow a client to view and interact with land based and underground asset data through a web browser, may provide an Application Programming Interface ("API") to allow external devices and systems to access land based and underground asset data, may provide data to proprietary programs executed on each client device, and the like.

Web server 201 may be one or more computing devices. Web server 201 may store land based data and underground asset data on a local storage device or may be operatively coupled to one or more database server 202 configured for storing and/or mapping land based data with underground asset data. One or more additional computing devices 203 may perform additional services, for example load balancing, caching, and the like. Of course, while plural servers such as web server 201, database server 202, and additional computing devices 203 may provide an Underground Asset Management System as shown in the architecture of FIG. 2, in alternative embodiments the system may be provided by a single computing device, a cloud computing architecture, or any other computing architecture. Server computing devices, such as web server 201, database server 202, and additional computing devices 203 may be separated from other networked computing devices by a firewall 211, thereby increasing the integrity of the system.

One or more data sources 231 may transmit land based data or underground asset data to web server 201. Data sources 231 may include companies providing land based data (e.g., maps and other geographic data), such as ESRI™, GOOGLE™, NASA™, as well as others. For example, UAMS 101 may use ArcGIS™ JavaScript API version 1.3 for displaying a base map, displaying a given address on the base map, buffering a specific area around the address, and querying the buffered area to check of any underground asset is present and may use GOOGLE™ MAPS JavaScript API version 2 for displaying the GOOGLE™ STREETVIEW for the given address. Of course, other combinations of data sources 231 may be implemented. Data sources 231 may also include asset owners or other entities providing underground asset data, such as utilities or government entities. Data sources 231 may periodically update their data and may send updated data to web server 201 after each update. For example, a utility may transmit updated data to web server 201 after a new communication line is buried, the data including information such as the location of the line. Alternatively, web server 201 may request updated information from data sources 231 periodically, for example on a regular schedule or in response to a dig request for a particular location. Requests may be in a proprietary format dictated by each data source 231, may be in a format compatible with an API for each data source 231, or may be in any other format. As shown, data sources 231 transmit data to web server 201 via network 210, however in alternative architectures data sources 231 may transmit data to web server 201 via other routes, for example by physically transmitting storage media (e.g., DVDs or other non-transitory media) having the data stored thereon. Data sources 231 may provide complete land based and asset data to web server 201 or may transmit only updated land based and/or asset data as the data changes over time. Data sources 231 may thus provide dynamic and live updates to web server 201.

Web server 201 may be configured to map the asset data to the land based data. Thus, web server 201 may provide a consolidated mapping of underground assets from plural asset owners to land based data. Additionally, by receiving periodic updates, web server 201 may maintain up-to-date mapping of underground assets to land based data. Web server 201 may provide a unified view of both the land based data and the asset data, such as a map showing all underground assets in an area. For example, a program accessing data from web server 201 may display a user navigable map showing all underground assets in an area. Alternatively, a browser may access a website hosted by web server 201 for displaying a user navigable map showing all underground assets in an area. Of course, these user interfaces may additionally provide for receipt of dig tickets from excavators, transmission of locate tickets for display to locators, receipt of various asset location information from locators, updates to land based data sources or asset owners, and the like.

In addition to mapping underground assets to land based data, embodiments may also map landmark data to the land based data and underground asset data. Landmark data may include any distinguishable structure on a map or landscape. Thus, landmarks do not need to be famous, such as the Eifel Tower, but may be any structure with distinguishable features, such as a house or a tree. For example, landmark data may be received by web server 101 that indicates where various landmarks are in a region. The landmark data may be mapped to the land based data. Because the underground assets are also mapped to the land based data, the location of underground assets may also be mapped in relation to various landmarks. Thus, a dig ticket may be received indicating an excavation location in relation to one or more landmarks rather than, or in addition to, the geographic coordinates (e.g., latitude and longitude) and the system may determine whether there are underground assets in the excavation location. Thus, dig tickets may be more reliably processed for excavators who do not have ready access to survey equipment, such as GPS sensors, and may not have address information for the excavation location, for example in developing countries.

Alternatively, asset owners may transmit underground asset data giving the location of an asset relative to a landmark rather than, or in addition to, other location information (e.g., geographic coordinates) and the system may map the underground assets to the land based data based on the mapping of landmarks to the land based data. This may improve the accuracy of mapping of assets, especially in areas or countries where sophisticated surveying equipment, such as equipment using GPS sensors, may not be readily available.

In addition to transmitting landmark information, basic location information, such as a town or other geographic region, may be transmitted to web server 101 as well. By reducing the size of the geographic region (i.e., by specifying a town or other geographic region), web server 101 may reduce the number of potential landmarks to recognize, thus increasing accuracy of landmark recognition and decreasing resource usage.

Web server 101 may also provide various geocoding and reverse geocoding services. For example, web server 101 may resolve a geographic coordinate (e.g., latitude and longitude) from information such as an address, a reference to one or more landmarks (e.g., distance from and position relative to a single landmark), imagery, and the like. This may be useful for receiving dig tickets when an excavator can provide an address for an excavation location but cannot provide geographic coordinates. Web server 101 may also provide information relating to addresses, landmarks, imagery, and the like when provided with a geographic coordinate. This may be useful for a locator to travel to an excavation location to inspect or to mark the location of underground assets.

Embodiments may provide geocoding services to match the address of either an asset's location or a dig request to a geographic coordinate. For example, web server 101 may include address data cross-referenced with locations on the land based data. Thus, when web server 101 receives address information, web server 101 may resolve the geographic coordinates for the address. Alternatively, web server 101 may query a separate service to resolve an address location. For example, an API request may be made to a geocoding API, such as those provided by YAHOO™ or GOOGLE™, to resolve the geographical coordinates associated with an address. Of course, web server 101 may be configured to receive addresses in varying forms according to country and custom. For example, an address in the United States may be provided in the format of an address line, a county and/or city, and state, or in the format of an address line and a ZIP code. Embodiments may also provide their own database to provide geocoding services.

For example, a custom locate function may invoke a method for locating an address on a map. The custom locate function may search a received address in one or more candidate search engines, for example those provided by GOOGLE™ MAPS, MICROSOFT™ BING™ MAPS, ArcGIS™ online services, and the like. For example, if a user inputs an address having a house number along with a street name, a custom locate function may be configured to show the address on the map if the exact address is found. The following is exemplary pseudo code for displaying a location on the map using a symbol if the address is found (i.e., the address has a candidate score of 100).

```
if (candidate.attributes.Loc_name == "Street_Address") {
    if (candidate.score == 100) {
        var infoTemplate = new esri.InfoTemplate("Location",
        "Address:
        ${address}<br />Score: ${score}<br />Source locator:
        ${locatorName}");
        var attributes = { address: candidate.address,
        score:candidate.score,
        locatorName:candidate.attributes.Loc_name };
        ----------------------------------------
        ----------------------------------------
        ----------------------------------------
        points.addPoint(candidate.location);
        myMap.graphics.add(graphic);
        map.setExtent(points.getExtent( ).expand(3));
    }
}
```

In other instances, an address may include a street name but not house number. In such instances, a custom locate function may be configured to show the entire street on the map. To do this, the function may get the returned addresses having a location name attribute as the street address and parse through a results array until the minimum and maximum house numbers on the street are retrieved from the array list. The function may then geocode the address of the minimum house number and of every twentieth house member thereafter until 100 house numbers more than the maximum house number is reached. This may ensure that house numbers after the maximum house number are retrieved from the array and included in case they are present. A polyline may then be created using the location of the first two addresses and the location of each address after that may be appended to the polyline. The following is exemplary pseudo code for displaying the location on the map.

```
if (candidate.attributes.Loc_name == "Street_Address") {
    if(!(isNaN(candidate.address.substring(0,candidate.address.indexOf(" ")))))
    {
        hNo1 =
candidate.address.substring(0,candidate.address.indexOf(" "));
        var temp = parseInt(hNo1);
        if(high == 0) {
            high = temp;
        }
        if(low == 0) {
            low == temp;
        }
        if(high<temp){
            high = temp;
        }
        if(temp<low){
            low = temp;
        }
        hNo =
candidate.address.substring(candidate.address.indexOf(" "));
    }
}
showAll( );
function showAll( ) {
    for(var j=low;j<=high+100;j=j+20){
        var address1 = j+hNo;
        house_num = true;
        entireStreet = true;
        var add = address1.split(",");
        var address = {
            Address : add[0],
            City: add[1],
            State: add[2],
            Zip: add[3]
        };
        locator.addressToLocations(address,["Loc_name"]);
    }
}
```

In still other instances, an input address having a house number along with a street name may be received by the address may not be found. In such instances, a user interface may display a dropdown box having a list of suggested addresses returned by the geocoder. For example, an HTML element may be added to hold the dropdown box. The following is exemplary pseudo code for such an instance.

```
if (candidate.attributes.Loc_name == "Street_Address") {
    if (candidate.score == 100) {
        //Code for displaying the address on the map
    }
    else if(entireStreet == false) {
        //A value of "false" for "entireStreet" indicates that house number
was given in the input
        var option = document.createElement("option"); //The HTML
    element
        option.text=candidate.address;
        option.value=candidate.address;
        ----------------------------------------
        ----------------------------------------
    }
}
if((candidateNum != 0) && (candidateShow == false)) {
//"candidateShow" indicates that the address has not been displayed on the
    map suggestion.appendChild(element);
}
```

Embodiments may also receive location information in addition to an address to provide more detailed geocoding. For example, a dig ticket may indicate the address of an excavation location as well as the fact that the excavation location is located forty-five feet north and sixty feet east of the south-west most point on the addressed property. Thus, web server 101 may first resolve the geographic coordinates of the address then resolve the specific geographic coordinates of the excavation location.

Reverse geocoding may be useful for locate tickets. For example, while the geographic coordinates of an excavation location may be useful for determining if underground assets are mapped to land based data at that location, a locate ticket's indication to a locator that an excavation location is located at a specific latitude and longitude may be less useful than an address. Thus, web server 101 may be configured to resolve a geographic location to an address in similar fashion to how it resolves an address to a geographic location.

Embodiments may also combine actual imagery of a location where an asset is buried with land based data. For example, land based data may be integrated with images provided by asset owners indicating the location of underground assets. Alternatively, images may be integrated with land based data from third parties, such as those provided by GOOGLE™ STREETVIEW™. For example, an excavator may transmit, along with a dig request for an excavation location, geographic coordinates for the location or an address for a location. As described above, web server 201 may then resolve the excavation location and determine if underground assets are present. In some cases, web server 201 may issue a locate ticket to send a locator to the excavation location, for example to inspect or to mark the location of underground assets. To assist the locator, web server 201 may resolve an image of the location and transmit it to the locator to assist the locator with finding the excavation location. Web server 201 may, for example, transmit a request to the GOOGLE™ MAPS™ API requesting one or more images (e.g., an image facing north, south, east, and west) taken from the excavation location. Web server 201 may then receive the images and transmit them to the locator's computing device, for example a smartphone 224.

Additionally, or in the alternative, after receiving a dig ticket from an excavator, web server 201 may resolve the excavation location, retrieve one or more images of the excavation location, and transmit one or more images of the excavation location to the excavator to confirm accuracy of the resolved location. For example, web server 201 may receive an address for an excavation location with a dig ticket, for example transmitted by an excavator's smartphone 224. Web server 201 may then resolve the excavation location based on the address. Web server 201 may then retrieve one or more images of the excavation location, for example by transmitting a request to the GOOGLE™ MAPS™ API for a STREETVIEW™ image of the location or at the address. Web server 201 may then receive one or more images of the excavation location and transmit them back to the excavator's smartphone 224 for confirmation of the excavation location. Additional information may be transmitted as well, for example indicating the angle from which the image was taken.

Aerial imagery may also be combined with land based data. For example, imagery from satellites or from Unmanned Arial Vehicles ("UAVs") may be mapped to the land based data. Alternatively, aerial imagery data may be integrated with land based data from third parties, such as those provided by GOOGLE™ EARTH™. For example, an excavator entering a dig ticket may indicate an excavation location on a user interface showing aerial images of the region surrounding the dig location. Alternatively, an excavator may transmit a dig ticket by providing other information, such as geographic coordinates, an address, or any combination thereof, and web server 201 may retrieve an aerial image of the dig location and transmit it to the excavator for confirmation of the accuracy of the excavation location. Aerial imagery may also be useful for identifying landmarks proximate an excavation location on a dig ticket.

Aerial imagery may also be useful for locate tickets. For example, in addition to other excavation location information, such as an address or geographic coordinates, a locator may be transmitted one or more aerial images of the excavation location. The image may assist the locator with locating of the excavation location.

Embodiments may also provide geocoding services that resolve a location to a geographic coordinate based on imagery. For example, an excavator may transmit one or more images of the landscape along with the dig ticket to web server 201. Web server 201 may execute image recognition software configured to recognize if the received landscape corresponds to a landscape image associated with a location on land bases data. For example, the landscape may be compared with a database of landscape images associated with land based data or may be compared with images from GOOGLE™ STREETVIEW™. Alternatively, web server 201 may access a third party's image recognition software, for example through an API provided by KOOABA™ or GOOGLE™ GOGGLES™. The image may then be recognized as a landscape and compared with a database of landscapes or with remotely hosted landscapes to determine the geographic coordinates.

Further, an image may be recognized as a landmark. In such instances, the geographic coordinates may be determined generally by knowing the location is proximate the landmark which may be recognized as a landmark mapped to land based data. Machine vision technology may be implemented to provide a more precise geographic location based on a derived distance from and direction relative to the landmark. In still other embodiments, GOOGLE™ MAPS API, or another service, may be queried to retrieve the location of a recognized landmark and it can be deduced that the excavation location must be proximate the location of the landmark. Web server 201 may then transmit a locate ticket to a locator including the image, thereby allowing a locator to determine the excavation location in relation to the landmark.

Of course, any or all of the above disclosed features may be used in combination. For example, an excavator may access a web based application hosted by web server 201 via a browser on their tablet 223. The excavator may transmit a dig ticket to web server 201 including the address of the excavation location as well as a photo of the excavation location taken by a camera on the excavator's tablet 223. Web server 201 may send a request to a geocoding server, such as GOOGLE™ MAPS API, to determine the geographic coordinates of the excavation location. Web server 201 may then determine that there are no underground assets within a determined buffer zone of the excavation area and transmit an indication that the dig ticket is validated back to the excavator's tablet 223. Alternatively, if assets are within the buffer zone, web server 201 may transmit a locate ticket to a locator on their smartphone 224. The locate ticket may, for example include both the address and the image of the excavation location, thereby allowing the locator to confirm the accuracy of the excavation location by confirming that the address matches the image. The locator may travel to the excavation location to manually confirm the automatic validation and/or to mark any nearby underground assets (e.g., plant flags or stakes, paint the ground, and the like). Web server 201 may also transmit data relating to the dig request to any government agencies, asset owners, proximate landowners, and the like.

Embodiments may, for example, use ArcGIS™ Server geometry service class to create a buffer. Exemplary code for creating a buffer may be:

```
var gsvc = new
    esri.tasks.GeometryService("http://sampleserver1.arcgisonline.com/
arcgis/rest/services/Geometry/GeometryServer");
```

After an address is displayed on the map, the candidate location coordinate may be used to buffer the point. A distance 100 feet around the address location may be buffered as well. ArcGIS Server QueryTask may then be used for retrieving the features from the utilities layer (e.g., layer containing underground asset data) to check if the buffer region and utility line intersect. Exemplary code may be:

```
var queryTas = new
    esri.tasks.QueryTask("http://gis.hudson.oh.us/ArcGIS/rest/services/
Water/MapServer/6");
    my Query = new esri.tasks.Query( );
    myQuery.returnGeometry = true;
```

Embodiments may also provide directions alone with locate tickets. For example, a locator's device, such as a smartphone 224, may indicate its location to web server 201. Web server 201 may then use the location of the locator as well as the excavation location to determine directions to the excavation location and transmit the directions to the excavator. Web server 201 may, for example, determine directions based on the land based data. Alternatively, web server 201 may request and receive directions from other sources, for example the GOOGLE™ MAPS API.

Figure 3:
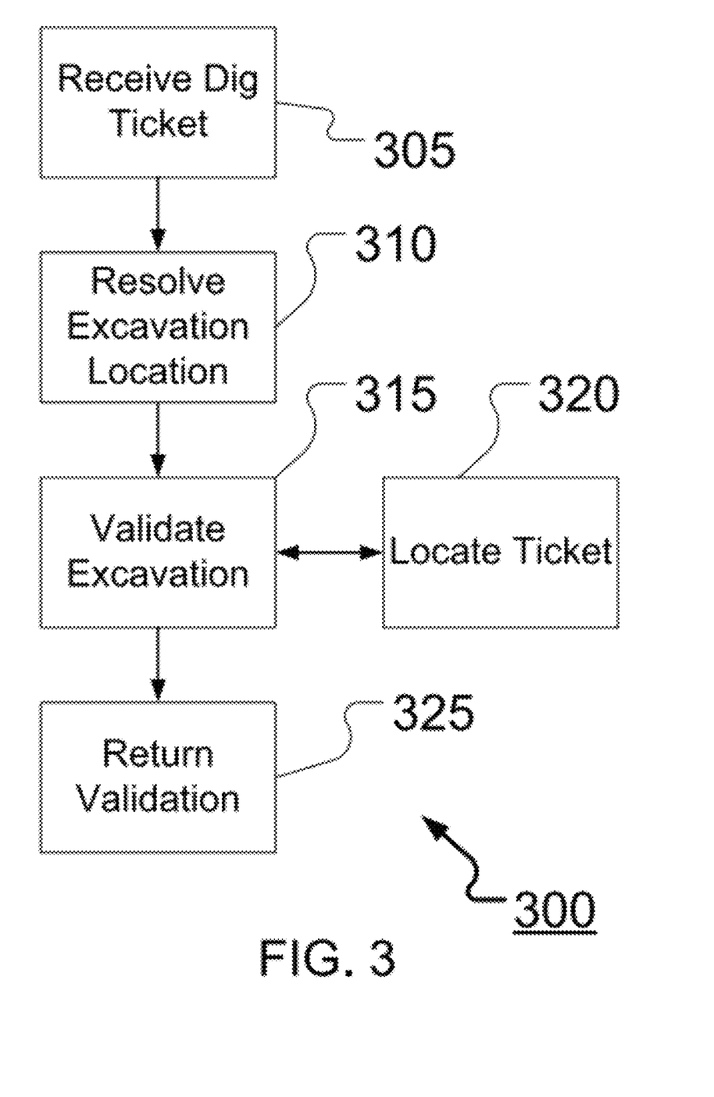
FIG. 3 shows an exemplary process that may be performed by an Underground Asset Management System.
Figure 4A:
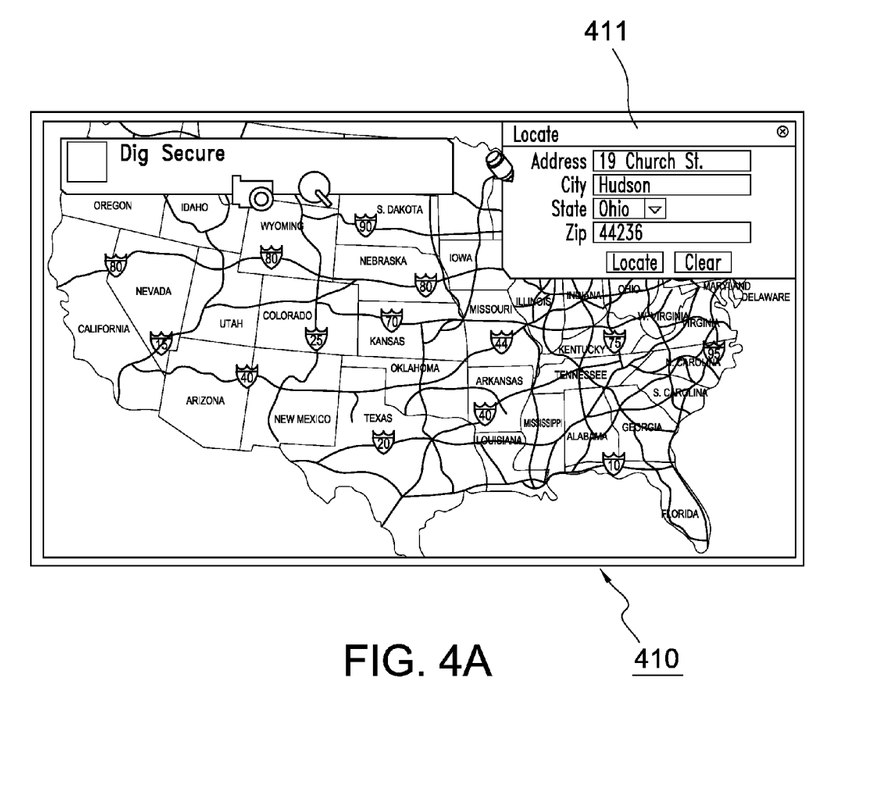
FIGS. 4A-4E show screenshots of an exemplary user interface for a device accessing an Underground Asset Management System.

FIG. 3 shows an exemplary process 300 that may be performed by an Underground Asset Management System ("UAMS"). At step 305, a UAMS may receive a dig ticket. UAMS may receive the dig ticket in any fashion, for example UAMS may include a call center where a receptionist may receive a call from a user (e.g., an excavator) and enter the dig ticket in a system. In an embodiment, a UAMS may provide a graphical user interface ("UI") to allow a user to enter a dig ticket. For example, FIG. 4a shows a screenshot for an exemplary UI 410 that may be useful for entering a dig ticket. UAMS may make UI 410 available through a web interface accessible through a web browser. UI 410 may include address entry controls 411 configured to allow a user to enter an address of a excavation location for a dig ticket. Alternatively, a user may zoom in on portions of the map and select the excavation location for a dig ticket. Of course, any user interface controls, such as cursors, buttons, text entry fields, dropdown menus, and the like may be implemented in UI 410. Additionally, UI 410 is exemplary only and other UIs may be used, such as text base consoles, web forms, etc. The dig ticket received in step 305 may specify the excavation location in many other fashions, for example by specifying the location relative to a landmark or by transmitting a picture of the excavation location to UAMS.

Referring again to FIG. 3, at step 310 UAMS may resolve the excavation location. Resolution methods may vary depending on the information received with the dig ticket. For example, if geographic coordinates are received the resolution step 310 may be skipped. Alternatively, if an address is received, then geocoding methods may be used to resolve the geographic location of the excavation request. Likewise, if landmark data is received, then landmark identification methods may be used to resolve the geographic location. Of course, if plural forms of excavation location information are received, such as geographical coordinates, an address, a location description with reference to a landmark, and a photo of the location, the method may check the consistency of the information and implement rules to determine the most likely excavation location. Additionally, if the data is conflicting, UAMS may alert the user who submitted the dig ticket, or any other entity, and require updated or clarified data.

Figure 4B:
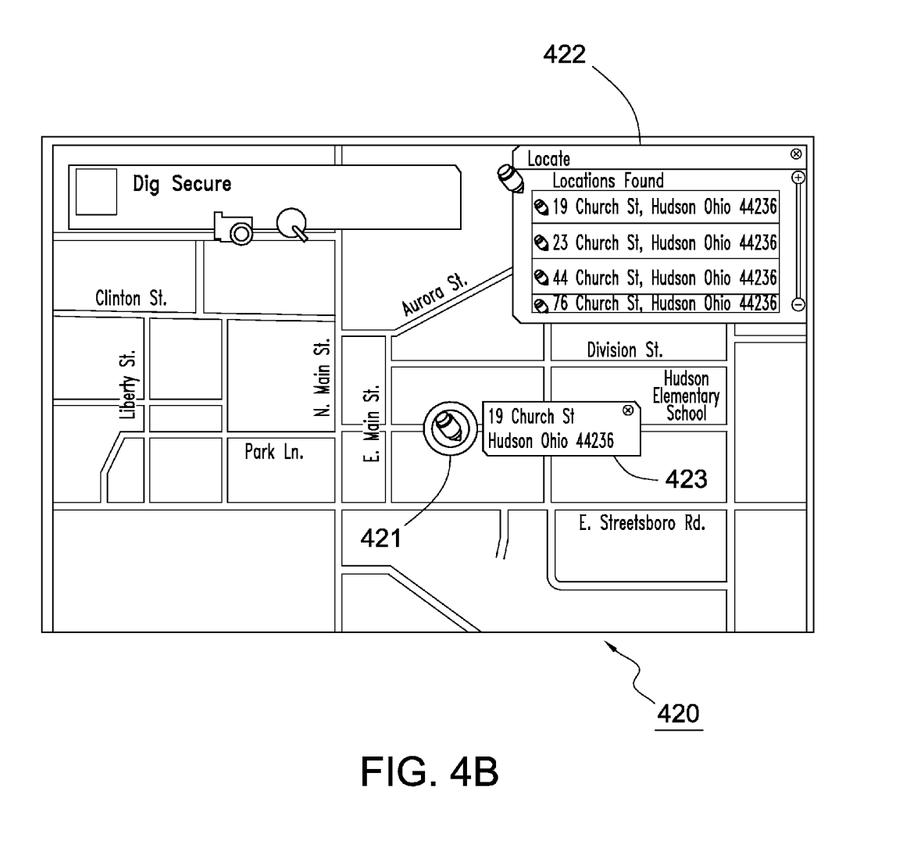

FIG. 4B shows an exemplary UI 420 showing a map indicating the excavation location entered in UI 410. UI 420 includes a visual indicator 421 on the map showing the excavation location. UI 420 also includes underground asset information 423 indicating the presence of underground assets at an excavation location. UI 420 additionally includes user controls 422 for confirming or changing the resolved excavation location. For example, user controls 422 may display the several most likely excavation locations based on the location information received with the dig request. If the visual indicator 421 shows the wrong excavation location, a user may manually select the correct one. Of course, other UI controls may allow the user to navigate the map to correct or change the excavation location, may allow the user to modify an address or other information originally entered with a dig ticket, or otherwise provide for user control.

Figure 4C:
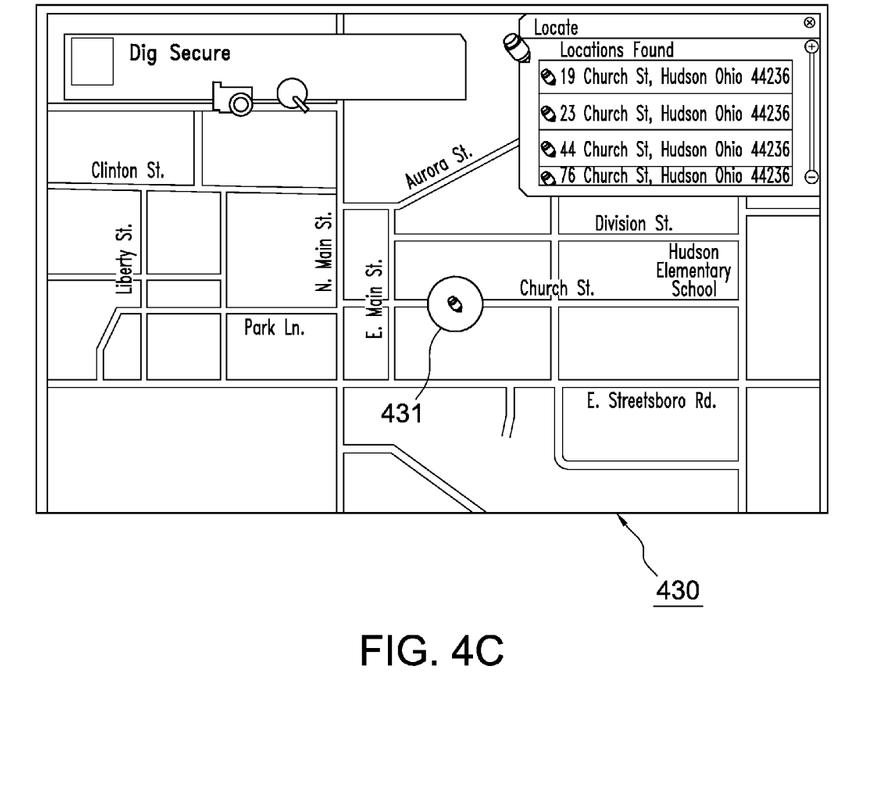

In step 315, UAMS may validate the excavation by either determining that the user who submitted the dig ticket is authorized to excavate at the excavation location, determine that the user is authorized to excavate but that a locator must be sent to the excavation location to mark the location of underground assets, or determining that the presence of certain underground assets at the excavation location precludes excavation. For example, an automated process may apply a set of rules and determine whether excavation is authorized, whether excavation is authorized with marking, or if excavation is not authorized. Alternatively, a person may review underground asset data mapped to land based data and determine excavation authorization. In some instances where tickers may not be resolved by automatic or manual screening, a locator may be required to travel to an excavation location to determine excavation authorization, for example if land based data and/or underground asset data appears inconsistent or anomalous at the excavation location. FIG. 4C shows an exemplary UI 430 showing a map indicating a buffered region 431 surrounding an underground asset where a user may not be authorized to dig.

Figure 4D:
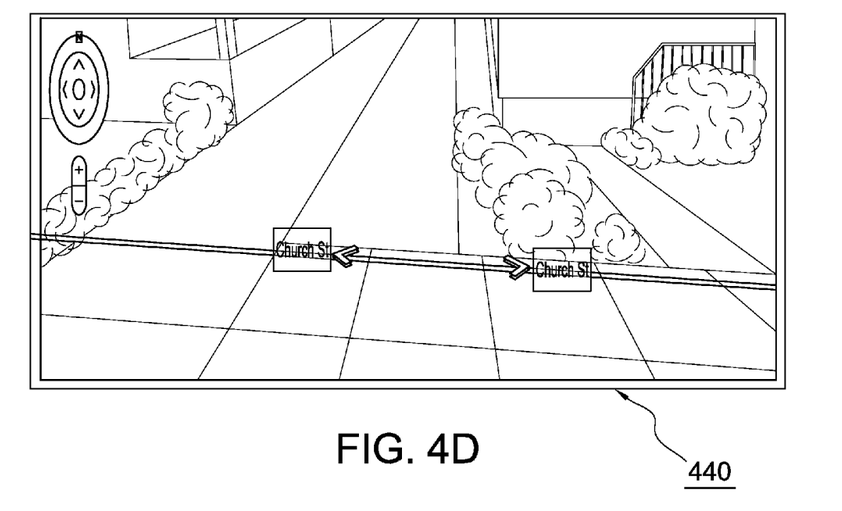

In instances where a locator must travel to the excavation location, for example to manually inspect the excavation location or to mark the location of underground assets and buffer regions surrounding underground assets, the system may be configured to generate and transmit a locate ticket 320. The locate ticket may be transmitted to a locator, for example by sending the locate ticket to an email account, by displaying the locate ticket on a website to be viewed by the locator, by sending the locate ticket to a specific program, and the like. The locate ticket may include a landscape image user interface 4D, for example from GOOGLE™ STREETVIEW. The locate ticket may be sent to a particular locator, for example to the locator nearest the excavation location or to a locator who is not busy to maximize workflow efficiency. A locator may not be required to respond to a locate ticket and it may be assumed that the locator will travel to the excavation location after receipt of the locate ticket to mark any underground assets. Alternatively, at step 320 a locator may transmit data back to validate excavation step 315, such as confirmation of receipt of the locate ticket, confirmation that the dig ticket is authorized, confirmation that the excavation location is marked, and the like. A locate ticket may also include in image of the excavation location, for UI 440 shows an exemplary navigable interface including an image of an excavation location.

At step 325, the system may return validation of the dig ticket to the user. For example, the system may transmit an indication that excavation is authorized. In other embodiments, a user who submits a dig ticket may assume that excavation is authorized as long as the user waits a predetermined amount of time (e.g., forty-eight hours) and receives no indication that excavation is not authorized.

Figure 4E:
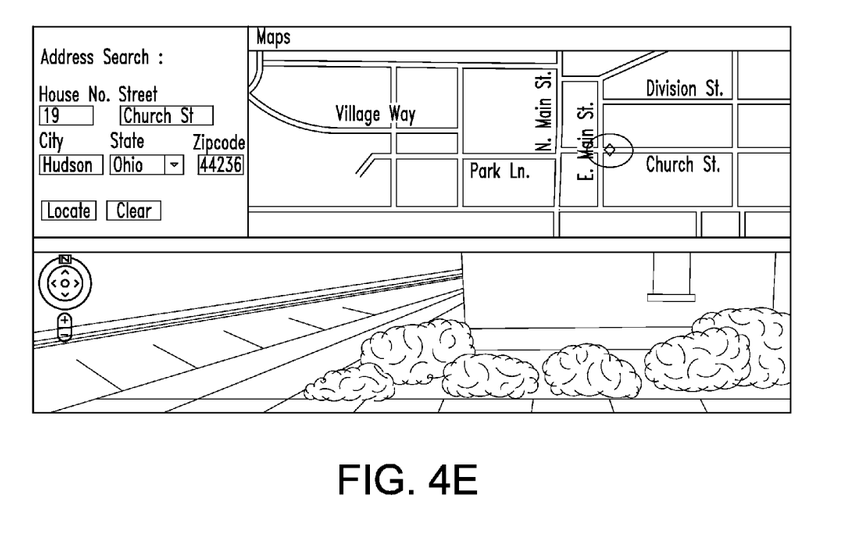

Embodiments may also display a result screen UI 4E. Result screen UI 4E may include a GOOGLE™ STREETVIEW for a location identified by both a house number and a street name. GOOGLE™ MAPS API may be used to resolve the location of the address. One or more HTML containers may be created to hold an image from GOOGLE™ STREETVIEW and display the latitude and longitude corresponding to the street address.

Figure 5:
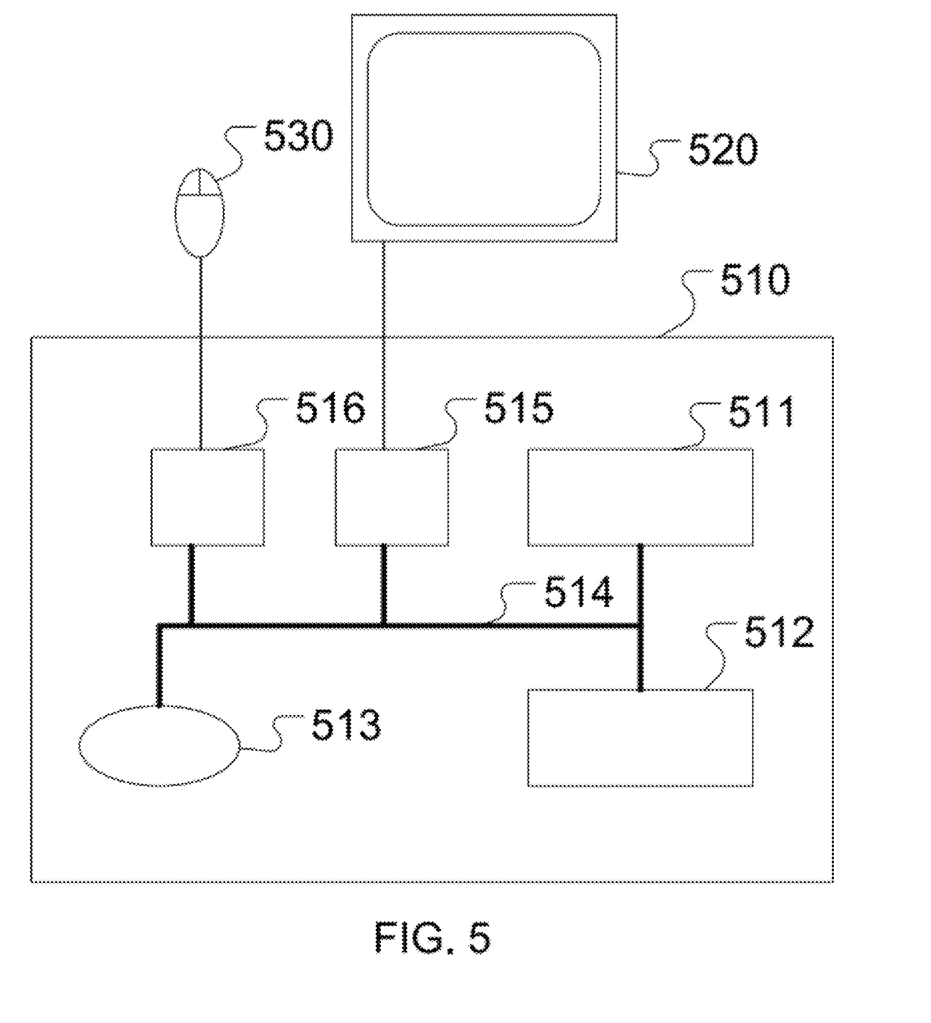
FIG. 5 shows an exemplary computing device useful for implementing systems and performing methods disclosed herein.

These embodiments may be implemented with software, for example modules executed on computing devices such as computing device 510 of FIG. 5. Embodiments may, for example, execute modules corresponding to steps shown in method 300. Of course, a single step may be performed by more than one module, a single module may perform more than one step, or any other logical division of steps of method 300 may be used to implement the processes as software executed on a computing device.

Computing device 510 has one or more processing device 511 designed to process instructions, for example computer readable instructions (i.e., code) stored on a storage device 513. By processing instructions, processing device 511 may perform the steps set forth in method 300. Storage device 513 may be any type of storage device (e.g., an optical storage device, a magnetic storage device, a solid state storage device, etc.), for example a non-transitory storage device. Alternatively, instructions may be stored in remote storage devices, for example storage devices accessed over a network or the internet. Computing device 510 additionally has memory 512, an input controller 516, and an output controller 515. A bus 514 operatively couples components of computing device 510, including processor 511, memory 512, storage device 513, input controller 516, output controller 515, and any other devices (e.g., network controllers, sound controllers, etc.). Output controller 515 may be operatively coupled (e.g., via a wired or wireless connection) to a display device 520 (e.g., a monitor, television, mobile device screen, touch-display, etc.) in such a fashion that output controller 515 can transform the display on display device 520 (e.g., in response to modules executed). Input controller 516 may be operatively coupled (e.g., via a wired or wireless connection) to input device 530 (e.g., mouse, keyboard, touch-pad, scroll-ball, touch-display, etc.) in such a fashion that input can be received from a user (e.g., a user may input with an input device 530 a dig ticket).

Of course, FIG. 5 illustrates computing device 510, display device 520, and input device 530 as separate devices for ease of identification only. Computing device 510, display device 520, and input device 530 may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing device 510 may be one or more servers, for example a farm of networked servers, a clustered server environment, or a cloud network of computing devices.

Thus, methods may provide for automated screening, manual screening, and field force intervention. Automated screening may require no human interaction to process a dig ticket. Manual screening may allow for a user to determine whether a dig ticket is authorized. The user may utilize a Uniform Asset Management System disclosed herein to determine dig ticket authorization. Field force intervention may include sending a locator to an excavation location to determine the proximity of underground assets to an excavation location.

The exemplary Uniform Asset Management Systems may be delivered according to a hosted server model, a managed service model, an off the shelf product, or in any other fashion. These models may be marketed under the name DIGSECURE. For example, a hosted service model may include providing a Uniform Asset Management System as an ondepend service, for example allowing users to interact with the system through a web interface. A managed service model may include offering an on-premises administered solution. An off the shelf product may be essentially a turn-key model that a user may simply install. Of course, any embodiments may utilize network connections to maintain up-to-date land based data and asset location information, software and security updates, ensure license compliance, and the like.

While embodiments disclosed herein are useful for processing dig tickets and providing information regarding the presence of underground assets at an excavation location, alternative embodiments may be useful for locating underground assets. For example, underground asset data mapped to land based data may be useful for locating an underground asset experiencing performance malfunctions, thereby allowing a repair crew to excavate and replace or repair the asset.

Embodiments disclosed above may store underground asset data mapped to land based data at a central location, may distribute the storage, for example in a cloud architecture, may store the mapped data locally on a client's (e.g., an asset owner's) computing device, and the like. Alternative embodiments may not store the asset data mapped to the land based data but rather provide a mashup including underground asset data mapped to land based data. For example, such as system may provide a user navigable map retrieved from the GOOGLE™ MAPS API and map to the user navigable map underground assets retrieved from one or more asset owner's API. In such embodiments, data may be maintained up to date because it is constantly gathered directly from the respective data provider. Additionally, such embodiments may require less resources, for example by minimizing storage and data transmission. However, such embodiments also may rely plural other systems to constantly be accessible and may require maintenance when changes are made to any system from which it relies.

Embodiments disclosed herein refer to multiple users or systems that may interact with an underground asset management system. However, these terms are not meant to be limiting. For example, "asset owners" may be utilities, government entities, individual people, corporations, or anyone that owns, controls, has an interest in, or otherwise has data relating to underground assets. Likewise, "excavators" need not be the people doing excavation, excavators may be home owners auditing the underground assets on their property or anyone else that may be interested in accessing the underground asset management system. "Regulatory agencies" and "locators" are also not intended as limiting terms, but merely examples of entities that may use an underground asset management system. Of course, any additional entities may also use the systems disclosed herein.

Further, while embodiments disclosed herein describe mapping underground assets to land based data, alternative embodiments may map above ground assets to land based data, for example above ground power lines, telecommunication lines, oil pipelines, and the like.

Embodiments have been disclosed herein. However, various modifications can be made without departing from the scope of the embodiments as defined by the appended claims and legal equivalents.

What is claimed is:

1. A method executed by one or more computing devices for managing underground assets, said method comprising:
receiving, by at least one of the one or more computing devices, a request for clearance to excavate, the request including a location identifier provided by an excavator;
resolving, by at least one of the one or more computing devices, a location based on the location identifier by selecting the location from a plurality of potential locations received from a plurality of map service providers based at least in part on an accuracy value corresponding to each of the plurality of potential locations;
retrieving, by at least one of the one or more computing devices, asset data corresponding to the location from an asset location database, wherein the asset location database includes location data regarding the positions of a plurality of assets owned by a plurality of asset owners, wherein the asset location database is maintained by receiving a plurality of updates regarding the positions of the plurality of assets from a plurality of computing devices managed by the plurality of asset owners, wherein the location data is periodically updated by one or more of the plurality of asset owners;

generating, by at least one of the one or more computing devices, a buffer zone around the resolved location;

querying, by at least one of the one or more computing devices, the buffer zone using the retrieved asset data to determine whether any assets are buried within the buffer zone;

transmitting, by at least one of the one or more computing devices, map data related to the determination of assets buried within the buffer zone, wherein the map data integrates land based data provided by at least one of the plurality of map service providers;

generating, by at least one of the one or more computing devices, a locate ticket for a locator when assets exist within the buffer zone that cannot be cleared based on automatic screening, the locate ticket including data which specifies at least the excavation location, the locate ticket being configured to direct the locator to travel to the excavation location to at least manually determine if underground assets are present or mark the location of underground assets; and receiving, by at least one of the one or more computing devices, information from the locator regarding at least one of confirmation of assets in the buffer zone and one or more additional assets in the buffer zone not identified in the asset data.

2. The method of claim 1, wherein the location identifier is an address of the location.

3. The method of claim 2, wherein the resolving step includes transmitting a request for the location associated with the address to the plurality of map service providers and receiving the plurality of potential locations.

4. The method of claim 2, wherein the resolving step includes searching at least one first map service provider in the plurality of map service providers for land based data to resolve the location based on the location identifier, wherein if the location cannot be resolved by searching the at least one first map service provider, the resolving step includes searching at least a second map service provider in the plurality of map service providers.

5. The method of claim 1, wherein the location identifier includes imagery of the location.

6. The method of claim 5, wherein the resolving step includes comparing the imagery of the location to image data associated with land based data and determining the location based on the image.

7. The method of claim 1, wherein the location identifier is a parameter related to a landmark.

8. The method of claim 1, further comprising:
transmitting imagery of the location for confirmation of accuracy of the resolution step;
receiving a confirmation indicator; and
transmitting a request for additional location identification if the confirmation indicator is negative.

9. The method of claim 1, wherein the step of transmitting data related to the determination of assets buried within the buffer zone includes transmitting imagery of the location.

10. The method of claim 1, further comprising:
transmitting a request for manual screening of the location; and
receiving validation of the location.

11. The method of claim 10, wherein the request for manual screening includes at least one of an image of the location, an address of the location, geographic coordinates of the location, and directions to the location.

12. The method of claim 1, wherein the accuracy value corresponding to each of the plurality of potential locations is determined based on one or more of: a consistency comparison of data provided by each map service provider in the plurality of map service providers with data provided by other map service providers in the plurality of map service providers and a comparison of an update time associated with data provided by each map service provider in the plurality of map service providers with other update times associated with data provided by other map service providers in the plurality of map service providers.

13. The method of claim 1, wherein the land based data provided by at least one of the plurality of map service providers is selected from land based data provided by the plurality of map service providers based at least in part on an accuracy value associated with data provided by each of the plurality of map service providers.

14. The method of claim 1, further comprising:
updating, by at least one of the one or more computing devices, the asset data to include information about the one or more additional assets received from the locator.

15. A system for managing underground assets, said system comprising:
one or more processors; and
one or more memories operatively coupled to at least one of the one or more processors and having instructions stored thereon that, when executed by at least one of the one or more processors, cause at least one of the one or more processors to:
receive a request for clearance to excavate, the request including a location identifier provided by an excavator;
resolve a location based on the location identifier by selecting the location from a plurality of potential locations received from a plurality of map service providers based at least in part on an accuracy value corresponding to each of the plurality of potential locations;
retrieve asset data corresponding to the location from an asset location database, wherein the asset location database includes location data regarding the positions of a plurality of assets owned by a plurality of asset owners, wherein the asset location database is maintained by receiving a plurality of updates regarding the positions of the plurality of assets from a plurality of computing devices managed by the plurality of asset owners, wherein the location data is periodically updated by one or more of the plurality of asset owners;
generate a buffer zone around the resolved location;
query the buffer zone using the retrieved asset data to determine whether any assets are buried within the buffer zone;
transmit map data related to the determination of assets buried within the buffer zone, wherein the map data integrates land based data provided by at least one of the plurality of map service providers;
generate a locate ticket for a locator when assets exist within the buffer zone that cannot be cleared based on automatic screening, the locate ticket including data which specifies at least the excavation location, the locate ticket being configured to direct the locator to travel to the excavation location to at least manually determine if underground assets are present or mark the location of underground assets; and receive information from the locator regarding at least one of confirmation of assets in the buffer zone and one or more additional assets in the buffer zone not identified in the asset data.

16. The system of claim 15, wherein at least one of the one or more memories has further instructions stored thereon that, when executed by at least one of the one or more processors, cause at least one of the one or more processors to:

transmit imagery of the location for confirmation of accuracy of the resolution step;

receive a confirmation indicator; and transmit a request for additional location identification if the confirmation indicator is negative.

17. The system of claim 15, wherein the accuracy value corresponding to each of the plurality of potential locations is determined based on one or more of: a consistency comparison of data provided by each map service provider in the plurality of map service providers with data provided by other map service providers in the plurality of map service providers and a comparison of an update time associated with data provided by each map service provider in the plurality of map service providers with other update times associated with data provided by other map service providers in the plurality of map service providers.

18. The system of claim 15, wherein the land based data provided by at least one of the plurality of map service providers is selected from land based data provided by the plurality of map service providers based at least in part on an accuracy value associated with data provided by each of the plurality of map service providers.

19. The system of claim 15, wherein at least one of the one or more memories has further instructions stored thereon that, when executed by at least one of the one or more processors, cause at least one of the one or more processors to:

update the asset data to include information about the one or more additional assets received from the locator.

20. At least one non-transitory computer-readable medium storing computer-readable instructions that, when executed by one or more computing devices, cause at least one of the one or more computing devices to:

receive a request for clearance to excavate, the request including a location identifier provided by an excavator;

resolve a location based on the location identifier by selecting the location from a plurality of potential locations received from a plurality of map service providers based at least in part on an accuracy value corresponding to each of the plurality of potential locations;

retrieve asset data corresponding to the location from an asset location database, wherein the asset location database includes location data regarding the positions of a plurality of assets owned by a plurality of asset owners, wherein the asset location database is maintained by receiving a plurality of updates regarding the positions of the plurality of assets from a plurality of computing devices managed by the plurality of asset owners, wherein the location data is periodically updated by one or more of the plurality of asset owners;

generate a buffer zone around the resolved location;

query the buffer zone using the retrieved asset data to determine whether any assets are buried within the buffer zone;

transmit map data related to the determination of assets buried within the buffer zone, wherein the map data integrates land based data provided by at least one of the plurality of map service providers;

generate a locate ticket au for a locator when assets exist within the buffer zone that cannot be cleared based on automatic screening, the locate ticket including data which specifies at least the excavation location, the locate ticket being configured to direct the locator to travel to the excavation location to at least manually determine if underground assets are present or mark the location of underground assets; and receive information from the locator regarding at least one of confirmation of assets in the buffer zone and one or more additional assets in the buffer zone not identified in the asset data.

21. The at least one non-transitory computer-readable medium of claim 20, wherein the location identifier is an address of the location.

22. The at least one non-transitory computer-readable medium of claim 21, wherein the resolving step includes transmitting a request for the location associated with the address to the plurality of map service providers and receiving the plurality of potential locations.

23. The at least one non-transitory computer-readable medium of claim 20, wherein the accuracy value corresponding to each of the plurality of potential locations is determined based on one or more of: a consistency comparison of data provided by each map service provider in the plurality of map service providers with data provided by other map service providers in the plurality of map service providers and a comparison of an update time associated with data provided by each map service provider in the plurality of map service providers with other update times associated with data provided by other map service providers in the plurality of map service providers.

24. The at least one non-transitory computer-readable medium of claim 20, wherein the land based data provided by at least one of the plurality of map service providers is selected from land based data provided by the plurality of map service providers based at least in part on an accuracy value associated with data provided by each of the plurality of map service providers.

25. The at least one non-transitory computer-readable medium of claim 20, wherein the asset data is updated to include information about the one or more additional assets received from the locator.

* * * * *